Patented Sept. 29, 1942

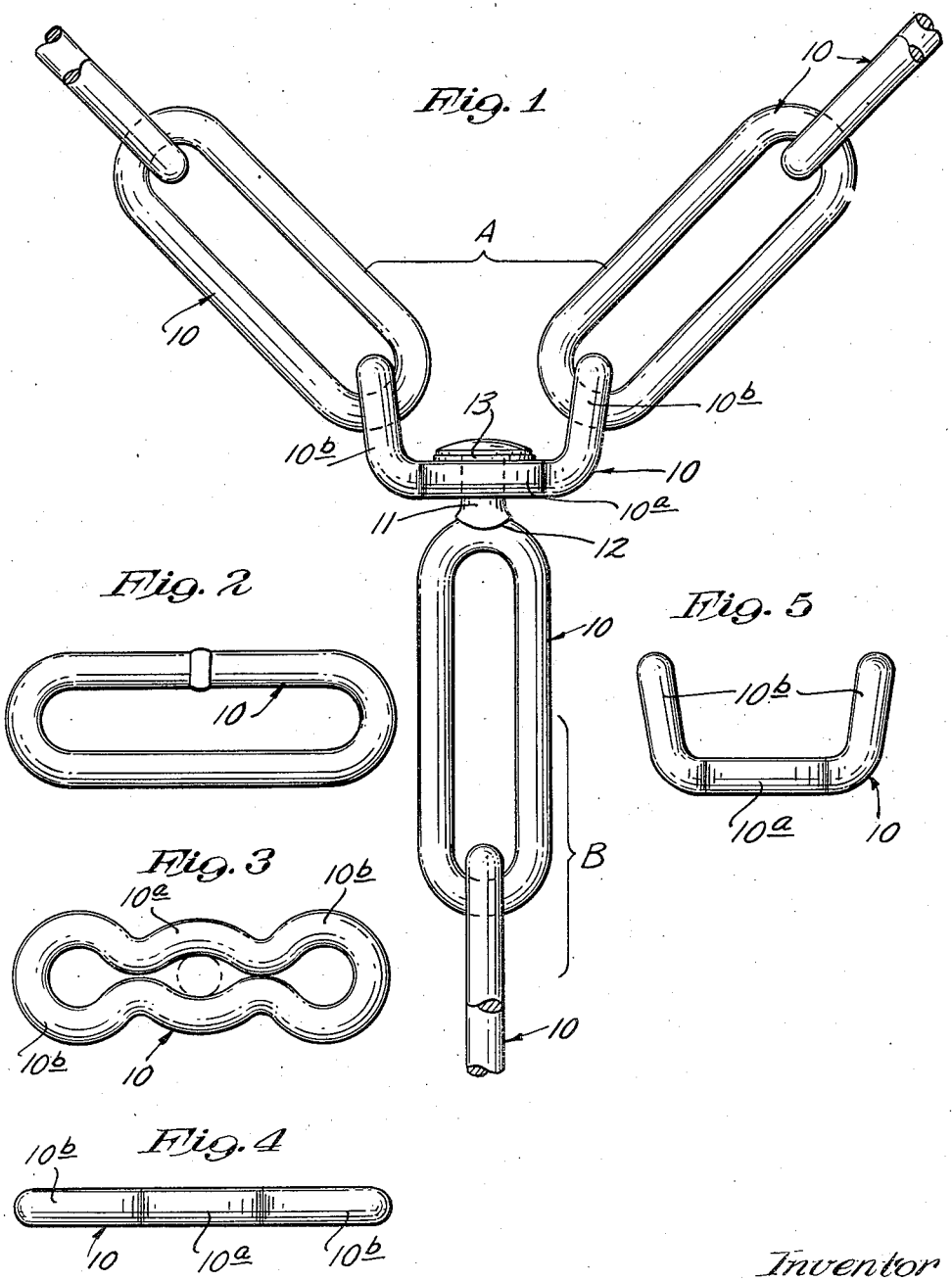

2,297,278

UNITED STATES PATENT OFFICE 2,297,278

METHOD OF PRODUCING SWIVELS IN LINK CHAIN STRUCTURES

Joseph B. Bambenek, Winona, Minn., assignor to Peerless Chain Company, Winona, Minn., a corporation of Minnesota Application April 23, 1942, Serial No. 440,142

7 Claims. (Cl. 59—9)

My present invention provides an improved method for economically making or producing swivel connections in link chain structures and, generally stated, consists of the novel steps or manipulations hereinafter described and defined in the claims.

Swivels, as is well known, are used in many chain structures. For example, chain swivels are employed in so-called "cow tie or hitch chains" wherein an anchoring chain is connected to an intermediate link of a neck chain, which latter is arranged to be applied around the neck of a cow or animal.

Ordinary link chains having links that are, for example, elongated or oval, are of common form and which can be produced at low cost by automatic chain machines. In accordance with my invention, I form a socket for the swivel connection simply by distorting one of the intermediate links of the one chain; and the swivel connection is completed by inserting a headed swivel stud or pin through the socket of the deformed link and welding the end thereof to the end link of the other chain.

The improved method is illustrated in connection with the drawing wherein like characters indicate like parts throughout the several views.

Referring to the drawing:

Fig. 1 is a plan view showing the improved swivel connection between the two chains or chain elements;

Fig. 2 is a plan view showing elongated or oval links from which the two chains are adapted to be made;

Fig. 3 shows an intermediate link of the one chain distorted to form the intermediate swivel socket;

Fig. 4 is an edge elevation of the distorted link shown in Fig. 3; and

Fig. 5 is a side or edge elevation showing the distorted link with its ends bent to form the distorted link into a sort of U-shaped structure.

In this illustration both chains are illustrated as made up of the elongated links 10. One of the chains illustrated in Fig. 1 is indicated as an entirety by the character A and the other chain is indicated as an entirety by the character B. One of the intermediate links of chain A is distorted, as shown in Fig. 3, to form the intermediate socket 10a and end loops or eyelets 10b. The swivel is completed by a headed stud 11 that is passed through the socket 10a and welded at 12 to one end of the end link 10 of the chain B.

The improved method is carried out by first making the chains A and B with their normal links such as may be economically and rapidly produced in chain machines of well known construction and operation. Then, by a press or suitable upsetting device, the intermediate link, that is to be converted into a socket-forming element, is distorted, as shown in Fig. 3, while the said link is coupled with other links of the chain. Then, the headed stud 11 is passed through the socket 10a and its projecting end is welded, preferably by electrical welding operation, to the adjacent end or portion of the end link 10 of chain B and thus the swivel is completed. A washer 13 is preferably placed on the headed swivel stud or pin 11 and will have frictional engagement with the socket and with the head of said pin. Inasmuch as the greatest friction will be between the washer and the socket-forming portion of the link, the wearing rotation will take place between the washer and the head of the swivel pin.

In some instances the distorted socket-forming link will be left straight, as shown in Fig. 4, but in other instances as, for example, when the chain A is to be applied around the neck of the cow or animal, the eyelet-forming end portions 10b will be bent upwardly or laterally, as shown in Figs. 1 and 5.

This application is filed as a continuation in part of my co-pending application entitled "Chain swivel," filed of date June 16, 1941, under Serial No. 398,262.

What I claim is:

1. The method of producing a chain structure with swivel connection therein, which consists first in forming chain sections, at least one of the links of which is an oblong link, in distorting the side portions of said oblong link to form a swivel socket at the intermediate portion thereof, in providing a headed swivel pin and inserting the same through the socket of said deformed link, and in welding a link to the projecting end of said swivel pin.

2. The method of producing a chain structure with swivel connection therein, which consists first in forming two link chains, at least one of the links of one of said chains being an oblong link, in distorting the side portions of said oblong link to form an intermediate swivel socket and eyelet-like end portions, while said intermediate link is interconnected to adjacent links, in providing a headed swivel pin and inserting the same through the socket of said deformed link, and in welding to the projecting end of said swivel pin an end link of the other chain.

3. The method defined in claim 2 which consists in bending the eyelet-like end portions of said deformed link laterally to give the said deformed link an approximately U-shaped form in side elevation.

4. The method defined in claim 1 which consists in applying to said swivel pin a washer before it is inserted through the socket of said deformed link.

5. The method of producing a chain structure with swivel connection therein, which consists first in forming chain sections, at least one of the links of which is an oblong link, in deforming the side portions of said oblong link to form a swivel socket at the intermediate portion thereof, in providing a headed swivel pin and inserting the same through the socket of said deformed link, and in securing a link to the projecting end of said swivel pin.

6. The method of producing a chain structure with swivel connection therein, which consists first in forming two link chains, at least one of the links of one of said chains being an oblong link, in deforming the side portions of said oblong link to form an intermediate swivel socket and eyelet-like end portions, while said intermediate link is interconnected to adjacent links, in providing a headed swivel pin and inserting the same through the socket of said deformed link, and in securing to the projecting end of said swivel pin an end link of the other chain.

7. The method of producing a chain structure with a swivel connection therein, which includes the following steps, to wit: the step of forming a chain, at least one of the links of which is an oblong link, the step of distorting the side portions of said link to form an intermediate swivel socket with looped end portions, the step of providing a swivel pin and inserting the same through the intermediate portion of said link, and the step of rigidly securing a link to the projecting end of said swivel pin.

JOSEPH B. BAMBENEK.